(12) United States Patent
Lee et al.

(10) Patent No.: US 8,977,854 B2
(45) Date of Patent: **\*Mar. 10, 2015**

(54) AUTOMATIC USER AUTHENTICATION AND IDENTIFICATION FOR MOBILE INSTANT MESSAGING APPLICATION

(71) Applicant: Research in Motion Limited, Waterloo (CA)

(72) Inventors: Dalsu Lee, Thornhill (CA); Kateryna Khvan, Mississauga (CA); Ken Kwok Wai Lo, Mississauga (CA); Andreea Livia Manolescu, Mississauga (CA); Michael Hin Kai Hung, Toronto (CA)

(73) Assignee: BlackBerry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/085,605

(22) Filed: Nov. 20, 2013

(65) Prior Publication Data

US 2014/0082363 A1 Mar. 20, 2014

Related U.S. Application Data

(63) Continuation of application No. 12/607,319, filed on Oct. 28, 2009, now Pat. No. 8,607,317.

(51) Int. Cl.
*H04L 9/32* (2006.01)
*H04L 12/58* (2006.01)
*H04W 12/06* (2009.01)
*G06F 15/16* (2006.01)

(52) U.S. Cl.
CPC .............. *H04L 9/3213* (2013.01); *H04L 51/04* (2013.01); *H04W 12/06* (2013.01); *H04L 51/28* (2013.01); *H04L 9/3234* (2013.01); *G06F 15/16* (2013.01); *H04L 51/38* (2013.01); *H04L 2209/80* (2013.01)
USPC ......... 713/170; 726/3; 726/2; 726/6; 709/206; 709/207

(58) Field of Classification Search
USPC ................ 713/170; 726/3, 2, 6; 709/206, 207
See application file for complete search history.

(56) References Cited

U.S. PATENT DOCUMENTS

| | | | |
|---|---|---|---|
| 2005/0021652 A1* | 1/2005 | McCormack | 709/207 |
| 2007/0226303 A1* | 9/2007 | Provo | 709/206 |
| 2008/0216153 A1* | 9/2008 | Aaltonen et al. | 726/3 |

* cited by examiner

*Primary Examiner* — Jeffrey Pwu
*Assistant Examiner* — Samuel Ambaye
(74) *Attorney, Agent, or Firm* — Steven M. Greenberg, Esq.; Donna Flores, Esq.; CRGO Law (57) ABSTRACT

Automatic identification and authentication of a user of a mobile application entails receiving from the wireless communications device a unique device identifier and an e-mail address corresponding to the wireless communications device, associating a registration identifier with the unique device identifier and the e-mail address, generating an authentication token, and communicating the authentication token and the registration identifier to the wireless communications device.

24 Claims, 8 Drawing Sheets

AUTOMATIC USER AUTHENTICATION AND IDENTIFICATION FOR MOBILE INSTANT MESSAGING APPLICATION

CROSS-REFERENCE TO RELATED APPLICATIONS

This application claims priority to U.S. patent application Ser. No. 12/607,319, filed Oct. 28, 2009, the entirety of which is incorporated herein by reference.

TECHNICAL FIELD

The present technology relates generally to wireless communications and, in particular, to user identification and authentication for wireless communications devices.

BACKGROUND

Wireless communications devices provide a panoply of functions and applications that makes these devices increasingly popular. For some applications such as, for example, e-mail, address book, calendar, client-server synchronization ensures that the user's messages, contacts, and appointments are backed up at the server, thus enabling easy recovery of this data in the event that the user switches to a new device or wipes the device. For other applications, where device data is not backed up at a server, this data is vulnerable to being lost if the user wipes the device or switches to a new device.

For instance, this is a problem with PIN messaging since this form of instant messaging uses the unique device identifier (PIN) as the transport address and thus does not relay data through a server. Instead, PIN messages are communicated directly from one device to another via the wireless network without being routed through a messenger server. A buddy list (a list of PINs for each of the user's contacts), user settings or other such information for the PIN messaging application are thus vulnerable to being lost if the user switches to a new device or wipes the device. While it is known in the art to interpose a server and to register the user at the server by creating an account user login or user ID, this solution leads to password fatigue and the insecure practice of reusing passwords. Accordingly, there remains a need for a technique to preserve device data when a device is switched or wiped without exacerbating the problem of password fatigue.

BRIEF DESCRIPTION OF THE DRAWINGS

Further features and advantages of the present technology will become apparent from the following detailed description, taken in combination with the appended drawings, in which.

DETAILED DESCRIPTION

In general, the present technology provides an innovative way for a server to automatically identify and authenticate a user of a mobile application such as, for example, an instant messaging application executing on a wireless communications device. The device communicates to the server a unique device identifier (e.g. a PIN number, ESN, IMEI or other code or number that uniquely identifies the wireless device) and an e-mail address (that is linked to the device). The server associates the unique device identifier and e-mail address with a registration identifier. The registration identifier, e-mail address and unique device identifier thus form a triplet that can be used to identify and authenticate the user even if the user changes the unique device identifier (e.g. by switching devices) or changes his e-mail address. This technique thereby enables the creation of an account (user ID and password) at the server for backing up application-related data. For example, in the specific context of an instant messaging application, the contacts (buddies), settings, profiles, etc. (that constitute the application-related data) can be backed up to the server and restored, when required, by accessing the account using the novel automatic identification and authentication protocol. This eliminates the need for the user to remember and enter a user ID and password to access his account on the server. Accordingly, this novel technology enables device data (that would otherwise be lost if the device was wiped or switched) to be preserved by storing this device data in an account at a server. The data can be easily and seamlessly retrieved by employing the novel automatic identification and authentication technique to access the data in the account at the server without requiring the user to enter a login ID or password.

Thus, a main aspect of the present technology is a method for automatic identification and authentication of a user of a mobile application executing on a wireless communications device. The method performed by the server entails receiving from the wireless communications device a unique device identifier and an e-mail address corresponding to the wireless communications device, associating a registration identifier with the unique device identifier and the e-mail address, generating an authentication token, and communicating the authentication token and the registration identifier to the wireless communications device.

Another main aspect of the present technology is a method for automatically registering a user of a mobile application executing on a wireless communications device with a server. The method performed by the wireless communications device entails determining an e-mail address corresponding to the wireless communications device, communicating to the server a unique device identifier and the e-mail address to enable a registration identifier stored at the server to be associated with the unique device identifier and the e-mail address, and receiving an authentication token and the registration identifier from the server.

Yet another main aspect of the present technology is a wireless communications device having a processor operatively coupled to memory for determining an e-mail address and a unique device identifier corresponding to the wireless communications device and a radiofrequency transceiver for communicating the unique device identifier and the e-mail address to a server to enable the server to associate a registration identifier with the unique device identifier and the e-mail address, the transceiver receiving back from the server the registration identifier and an authentication token.

Yet a further main aspect of the present technology is a mobile application server having a network connection for receiving from a wireless communications device a unique device identifier and an e-mail address corresponding to the wireless communications device, a memory for storing a registration identifier, a processor operatively coupled to the memory for associating the registration identifier with the unique device identifier and the e-mail address, for generating an authentication token and for communicating via e-mail the authentication token and the registration identifier to the wireless communications device.

Still a further main aspect of the present technology is a method for automatic identification and authentication of a user to access an account. The method involves creating an account at a server by associating a registration identifier for the account with a unique device identifier for a device and an e-mail address associated with the device and accessing the account by communicating to the server the registration identifier and an authentication token that was provided to the device by the server when the account was created.

The details and particulars of these aspects of the technology will now be described below, by way of example, with reference to the attached drawings.

Device

Figure 1:
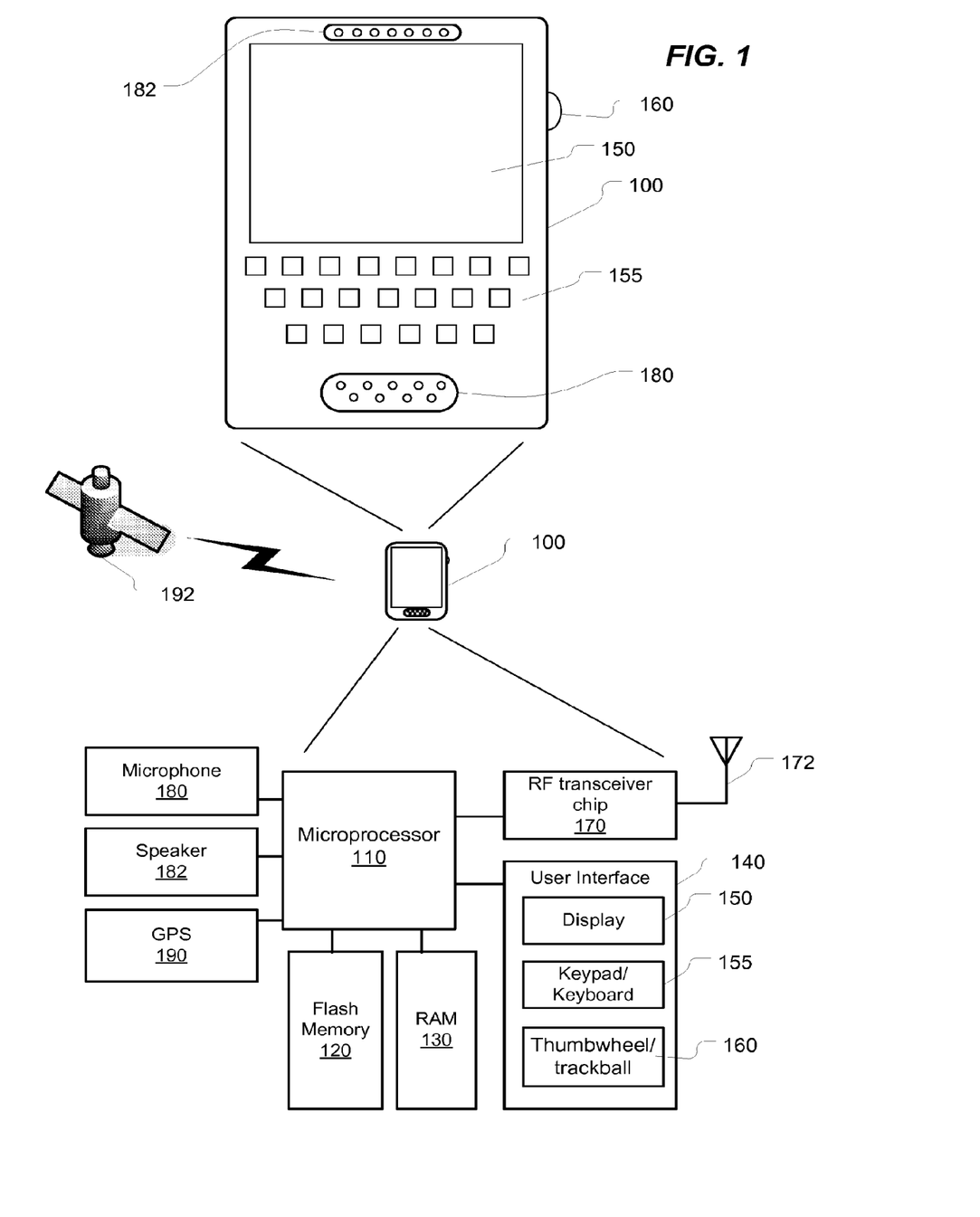
FIG. 1 is a schematic depiction of one example of a wireless communications device on which the present technology can be implemented.

FIG. 1 is a schematic depiction of one example of a wireless communications device 100 on which the present technology can be implemented. The term "wireless communications device" is meant to encompass a broad range of cellular and mobile devices such as, for example, smartphones, cell phones, satellite phones, wireless-enabled personal digital assistants (PDAs), wireless-enabled computing tablets, wireless-enabled laptops, etc.

As shown schematically in FIG. 1, the wireless communications device 100 includes a microprocessor (referred to herein as a "processor") 110 operatively coupled to memory (Flash Memory 120 and/or RAM 130). The device 100 has a user interface 140 which includes a display (e.g. an LCD screen) 150, a keyboard/keypad 155. A thumbwheel/trackball 160 may optionally be provided as part of the user interface. Alternatively, the user interface 140 may include a touch screen in lieu of a keyboard/keypad. The wireless communications device 100 includes a radiofrequency (RF) transceiver chipset 170 for wirelessly transmitting and receiving data and voice communications, e.g. via a cellular network. The wireless communications may be performed using CDMA, GSM, or any other suitable communications standard or protocol. A microphone 180 and speaker 182 are provided for voice communications, although these are not necessary for implementing the present authentication technique as it does not involve voice communications.

As further depicted in FIG. 1, the wireless communications device 100 may include a Global Positioning System (GPS) chipset 190 (or other position-determining subsystem) to determine the current location of the device from radiofrequency signals emitted by a plurality of orbiting GPS satellites.

In the novel wireless communications device, the processor and memory act to determine an e-mail address and a unique device identifier corresponding to the wireless communications device. For example, the device looks up its own PIN or other unique device identifier. The device also identifies the user's e-mail address (i.e. the user's e-mail address that the e-mail application on the user's device uses to send and receive mail from the device). The radiofrequency transceiver then communicates the unique device identifier and the e-mail address to a server to enable the server to associate a registration identifier with the unique device identifier and the e-mail address. This registration of the user results in an authentication token being created. The registration effectively creates an account at the server with the authentication token acting as the password and the registration ID as the user ID. The transceiver receives back from the server the registration identifier and an authentication token.

The wireless communications device thus automatically registers itself with the server by sending its unique device identifier (e.g. its PIN) and the e-mail address used by the device. Once duly registered, the device can thus sign on to a server automatically without requiring the user to remember and enter a user ID and password. In other words, once registered, the device can interact automatically with the server by automatically identifying and authenticating itself with the server without user intervention or input. This eliminates the problems associated with "password fatigue", i.e. the nuisance of having to remember and enter a password.

In the specific application of PIN messaging, i.e. instant messaging where the devices use their unique device identifiers as transport addresses, this novel authentication technology can be used to automatically access PIN-related data stored in a user account at a server. This data may be accessed after having switched devices or after having wiped a device. In either instance, the authentication technique may be used to access and retrieve backed-up PIN-related data (e.g. to restore contact lists, settings, profiles, etc. on the device).

Conventionally, when a user switches devices or wipes a device, all PIN-related information (e.g. contact lists, settings, profiles, etc.) is lost. This new authentication technology makes it possible to automatically access backed-up data stored in a user account at a server in order to restore that data to the device. The backed-up data is accessed automatically in the sense that the user is not prompted to enter a login ID or password to identify himself or to be authenticated as the rightful owner of the account. Thus, when a user switches to a new device with a new PIN or wipes an existing device, the new device or wiped device can retrieve stored PIN-related information from the user's account without requiring that the user remember and enter a password.

The foregoing technique requires first that an account or registration be created at the server (e.g. at the instant messaging server). Creation of the account may be user-initiated or automatic. For example, when the user of a new device first communicates with the instant messaging server, the device may automatically send its new PIN and e-mail address to the server. Alternatively, the device may query the user for authorization to create such an account. In any event, creation of an account entails communicating the device PIN and e-mail address to the server whereupon the PIN and e-mail are associated with an account or registration ID. Thereafter, the server can recognize the user automatically from the e-mail address alone. In other words, the e-mail address links the user to a certain registration ID (account). Once an account or registration is created, it can be used to store or back-up PIN-related information such as, for example, contact lists, buddy lists, user profiles, settings, preferences, etc.

Once the account has been created, the account can be accessed by the device by simply communicating to the server hosting the account the registration identifier and authentication token, which act as the login ID and password, respectively. Any new data to be backed-up (new contact or buddy information, adjusted settings, modified profiles, etc.) can be backed up periodically by accessing the user account. Accessing of the user account is accomplished using the automatic identification and authentication technique, i.e. without requiring the user to enter any login ID or password. The data stored in the user account can be retrieved if erased from the memory of the device. Data can be restored by accessing the account using the same identification and authentication technique (i.e. by logging in using the registration ID and authentication token).

If the device wiped or if the user switches the old device to a new device, the registration ID and authentication token are no longer available on the device. In that case, access to the user account at the server is still possible. The device must communicate its unique device identifier (e.g. PIN), if still available on the device, and/or the e-mail address that was used to create the account. By recognizing either the unique device identifier or e-mail address, the server can identify which account belongs to the user. Once the account is identified, data may be restored to the wiped device or downloaded to the new device.

Figure 2:
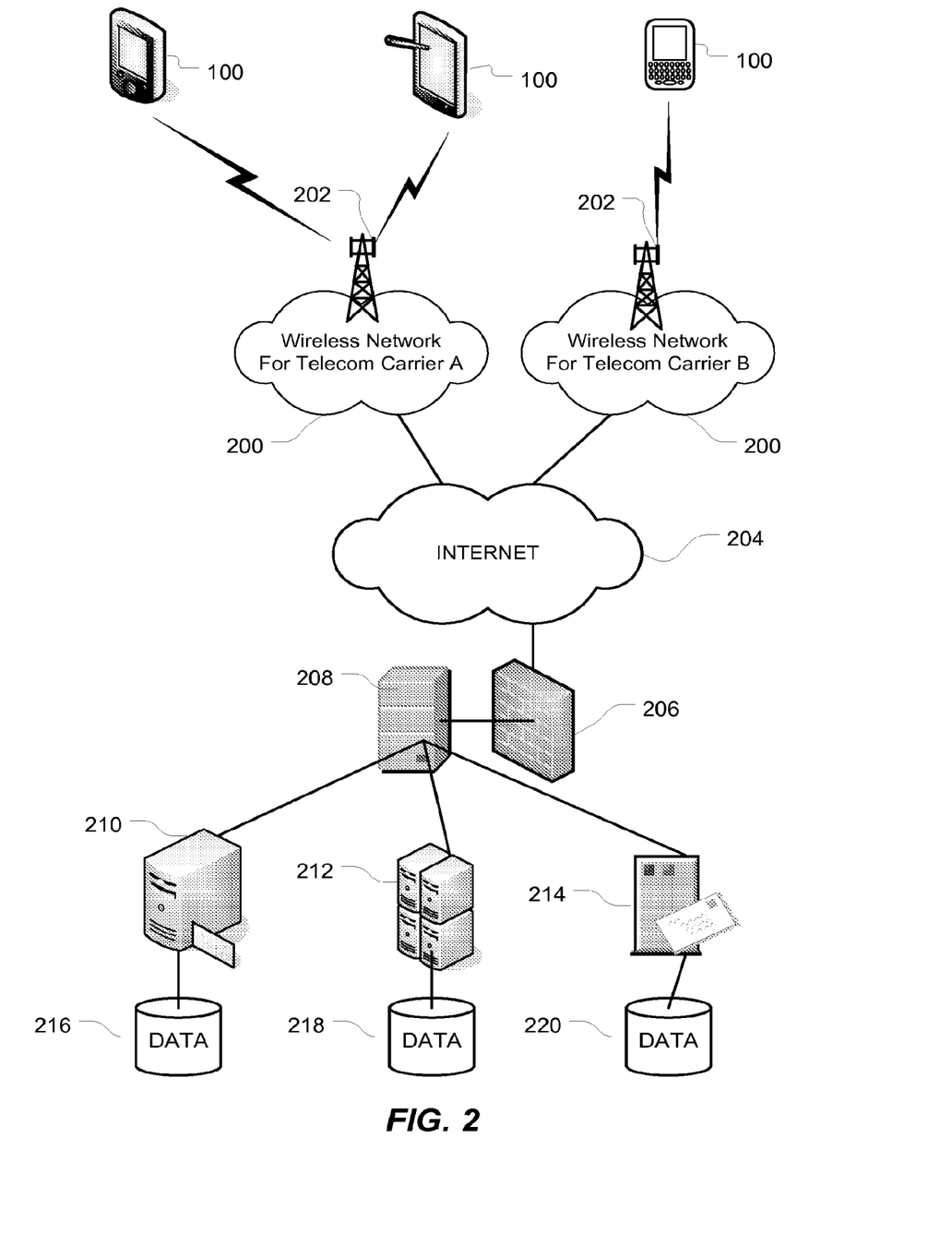
FIG. 2 is a schematic depiction of a plurality of wireless communications devices connected to an instant messaging server, e-mail server and applications server via wireless networks and the Internet.

FIG. 2 schematically depicts an example of a network on which the present technology may be implemented. In this example network, wireless communications devices 100 communicate via wireless networks 202 having base station towers 202. The wireless networks 202 are connected to the Internet 204 to enable the wireless communications devices to browse the Web, exchange e-mails, etc. Clients on the wireless communications devices 100 communicate through a firewall 206 and an enterprise server 208 with various servers (e.g. e-mail server 210, applications server 212 and instant messaging server 214). Each of these servers 210, 212 and 214 may be connected to its respective data store or database 216, 218 and 220. Conventionally, PIN messages are exchanged directly between devices through the wireless network without being relayed through the enterprise server. The PIN serves both as a unique device identifier and also as a transport address. Using the novel technology disclosed herein, the device registers automatically with the instant messaging server by providing an e-mail address and the PIN (or other unique device identifier). The instant messaging server associates the registration identifier (registration ID) with the e-mail address and PIN (or other unique device identifier) and provides the device with an authentication token along with the registration ID. Contacts, buddies and other such information can be stored (backed up) at the instant messaging server in association with a user account identified by the registration ID and e-mail address and thus can be restored or recovered in the event the user wipes his device or switches to a new device with a new PIN. This will be elaborated below.

Mobile Application Server

Figure 3:
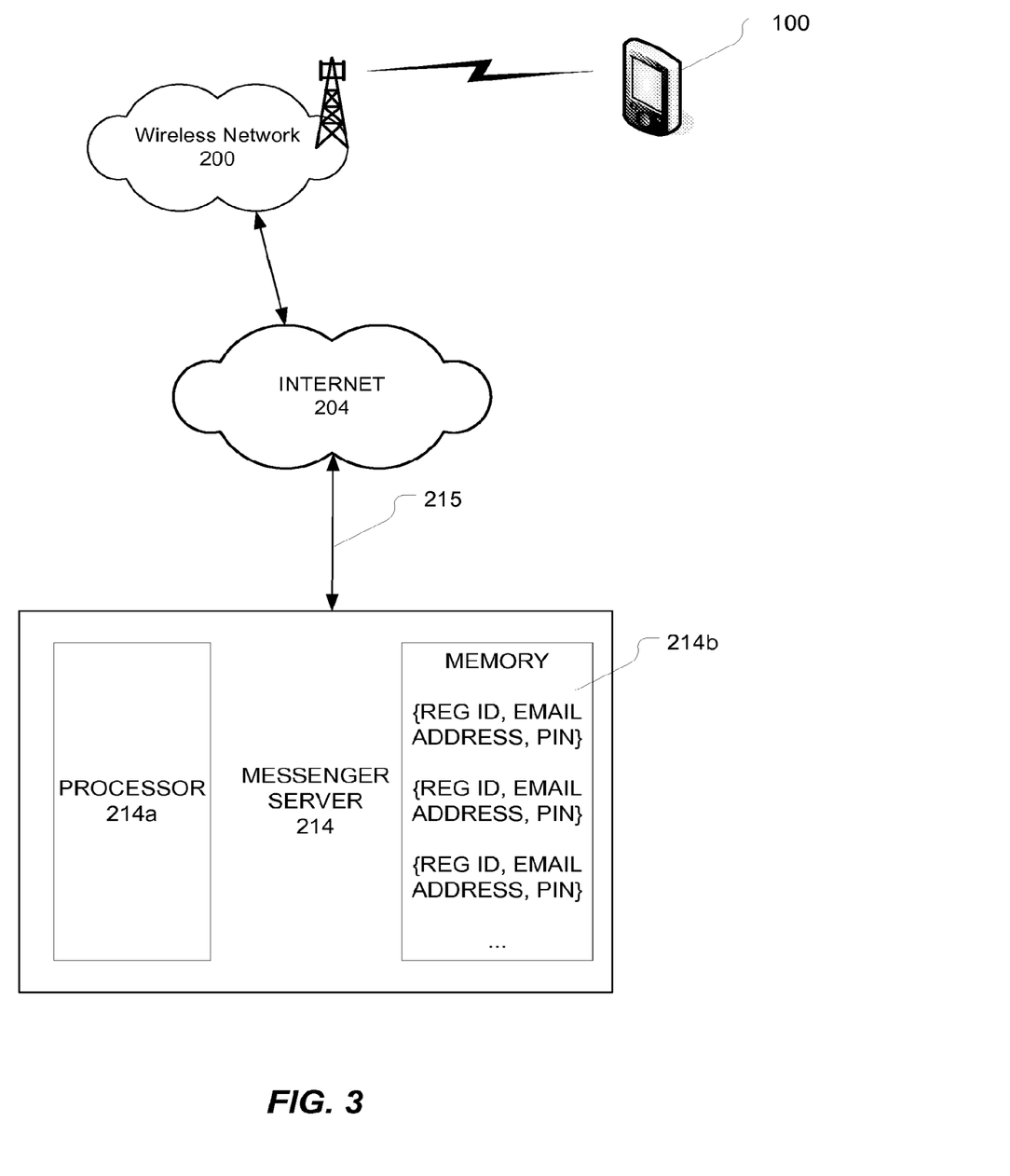
FIG. 3 schematically depicts an instant messaging server (messenger server) as one example of a mobile application server that may implement the present technology to automatically identify and authenticate device users.

One aspect of this novel technology is a mobile application server such as, for example, an instant messaging server 214 that interacts with the device 100, as shown by way of example in FIG. 3, to identify and authenticate the user using the e-mail address and device PIN (or other such unique device identifier). The mobile application server identifies and authenticates the user without requiring the user to enter a user ID or password. Since the user does not have to remember or enter a password, this solution helps to mitigate the growing problem of "password fatigue" and also obviates the insecure practice of reusing the same password for logging into different applications.

As depicted schematically in FIG. 3, a mobile application server such as, for example, an instant messaging server ("messenger server") 214 has a network connection 215 for receiving from a wireless communications device 100 a unique device identifier (e.g. a PIN) and an e-mail address corresponding to the wireless communications device. The server 214 has a memory 214b for storing a registration identifier. The server 214 also has a processor 214a operatively coupled to the memory for associating the registration identifier with the unique device identifier (e.g. PIN) and the e-mail address. The processor and memory act to also generate an authentication token. The network connection 215 is the used to communicate via e-mail the authentication token and the registration identifier to the wireless communications device 100. Specifically, in the system presented by way of example in FIG. 3, the e-mail is communicated through the Internet 204 and wireless network 200 to the device 100. As shown in FIG. 3, the memory 214b is used to store data triplets (registration ID, e-mail address and PIN) for a plurality of users. The memory or data store may be local or remote to the server.

Methods

Figure 4:
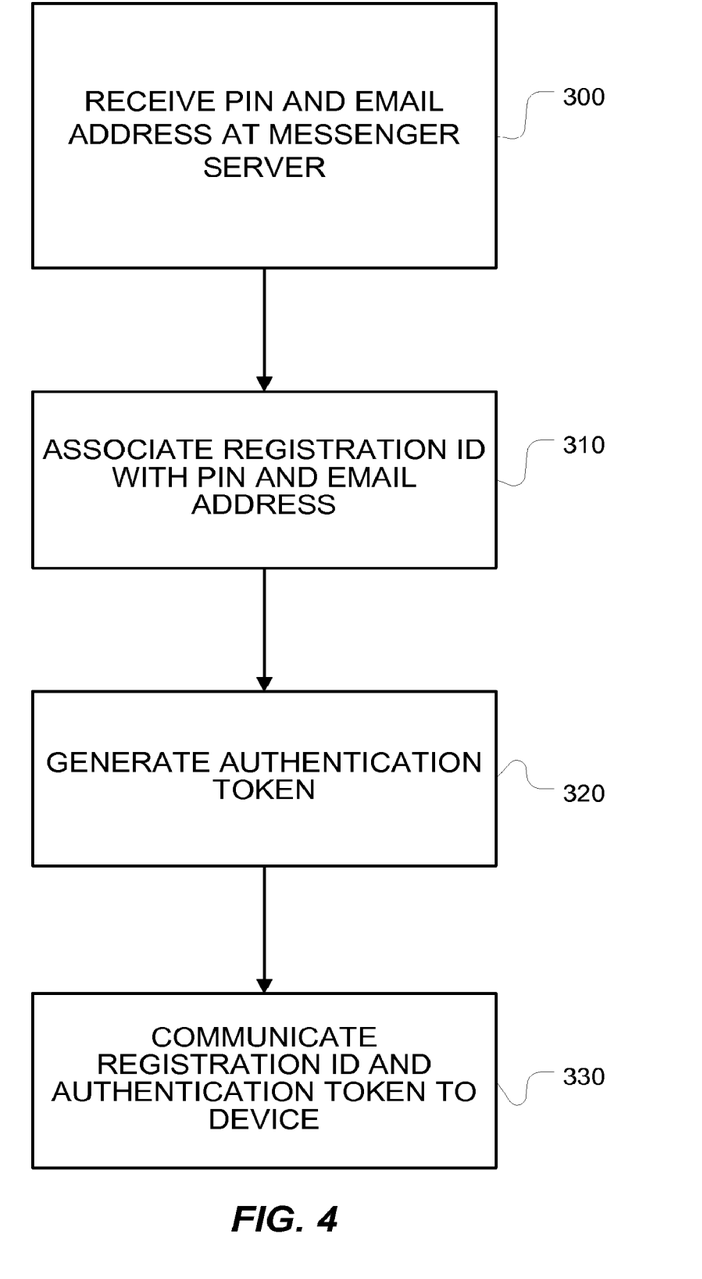
FIG. 4 is a flowchart outlining some of the main steps of a method of automatically identifying and authenticating a user of a mobile application.

A method of automatically identifying and authenticating a user of a mobile application such as, for example, an instant messaging application, with a mobile application server (e.g. an instant messaging server) can be performed as depicted in FIG. 4. As shown in FIG. 4, the method (which is performed by the server) entails a step 300 of receiving the PIN (or other unique device identifier) and e-mail address at the instant messaging server. Subsequently, at step 310, the PIN and e-mail address are associated by the server with a registration identifier (or registration ID). The registration ID, in one implementation, may be generated prior to receipt of the e-mail address and PIN. In another implementation, the registration ID may be generated upon receipt of the PIN and e-mail address. In any event, the registration ID is linked to (associated with) the e-mail address and the PIN. This registration ID is functionally equivalent to a user ID. An authentication token (which is functionally equivalent to a password) is then generated for the registration ID (user ID) at step 320. The registration ID and authentication token is then communicated to the device at step 330. At this point, the user account is set up (the user is registered). The registration ID performs the role of the user ID while the authentication token performs the role of the password. To interact with the server, the user need not enter a user ID or password. The device automatically identifies and authenticates itself by supplying its registration ID (as the functional equivalent of a login ID) and the authentication token (as the functional equivalent of a password).

Figure 5:
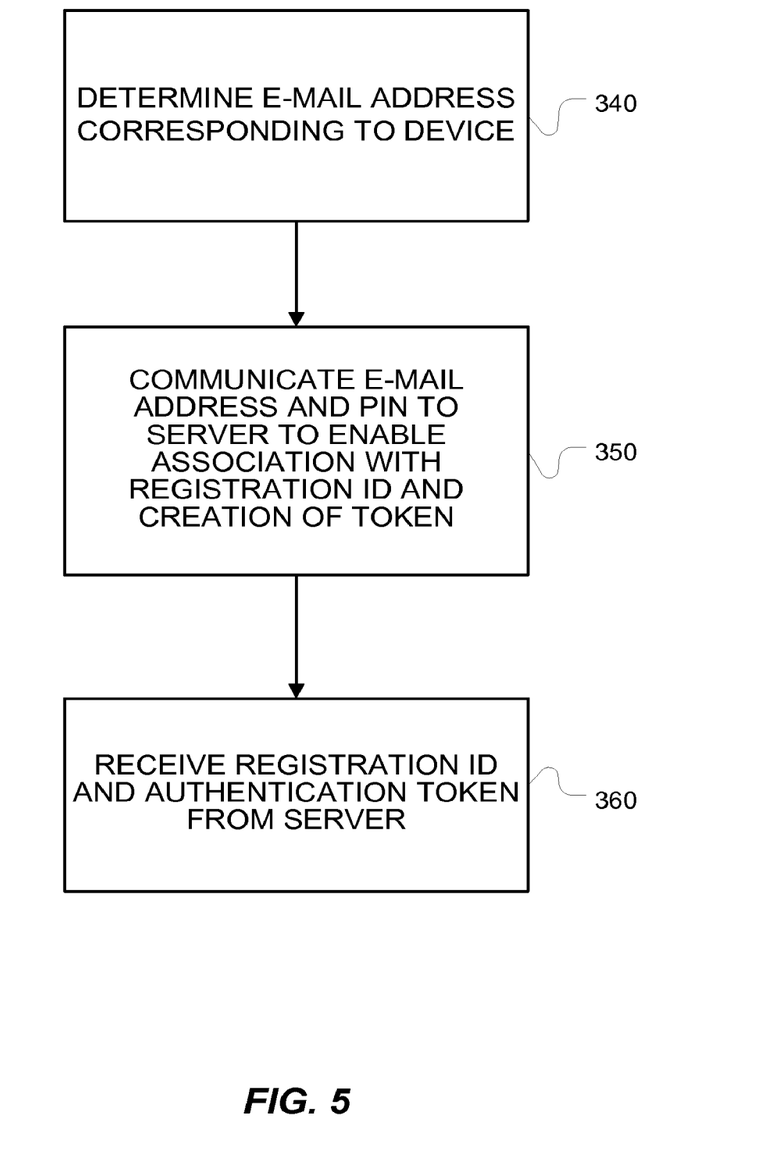
FIG. 5 is a flowchart outlining some of the main steps of a method of automatically registering a user of a mobile application with a server.

FIG. 5 presents a complementary method (performed by the device) whereby the device automatically registers itself with a server without requiring the user of the device to remember and enter a user ID and password. In this method, at step 340, the device determines an e-mail address corresponding to the wireless communications device. For example, the device may be configured so that e-mail from a mail server is pushed to the device. The e-mail address is then identified as being linked to that particular wireless communications device. It should be noted that the wireless communications device may be linked to more than one e-mail address. At step 350, the wireless communications device communicates to the server a unique device identifier and the e-mail address. This enables a registration identifier stored at the server to be associated with the unique device identifier and the e-mail address. Subsequently, at step 360, the device receives an authentication token and the registration identifier from the server. This registration ID and token can then be used to enable the device to interact with the server without requiring the user to enter a login ID or password.

Figure 6:
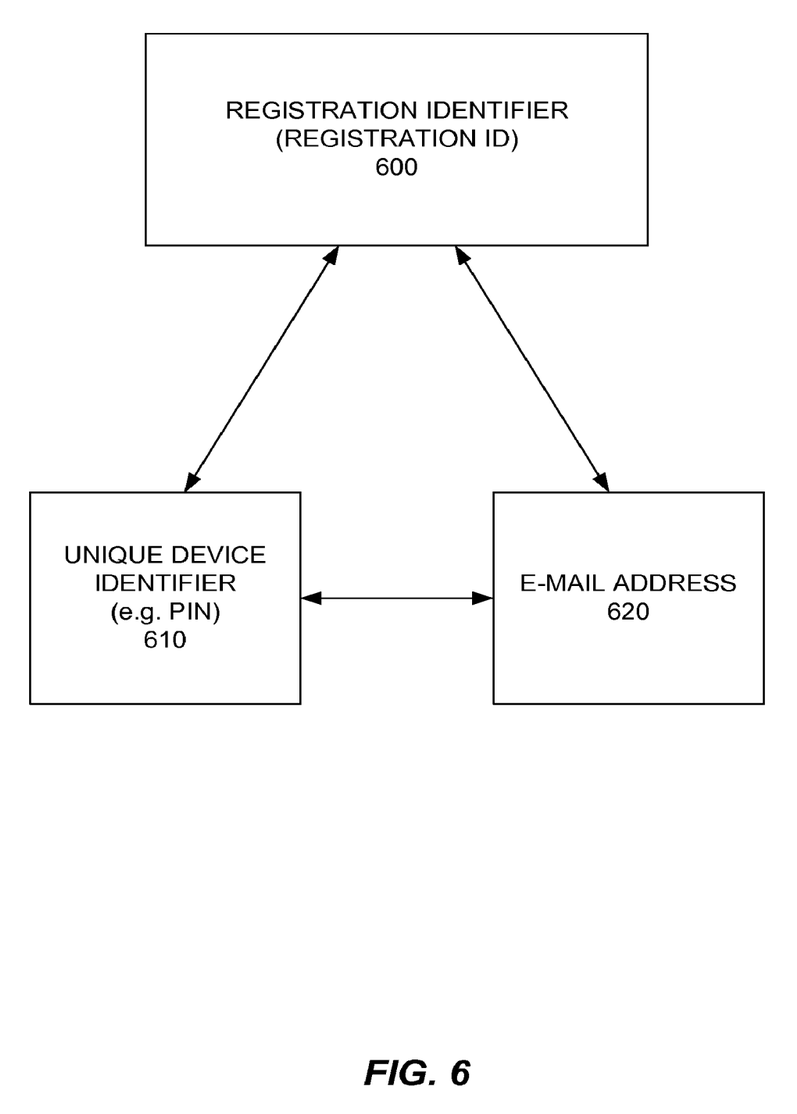
FIG. 6 is a diagram depicting a data model for the user account in which a registration ID is associated with a PIN and an e-mail address.

FIG. 6 is a diagram depicting a data model for the user account in which a registration ID (registration identifier 600) is associated with a PIN (or other unique device identifier 610) and an e-mail address 620. The registration ID, PIN, and e-mail address form a data triplet. As long as the registration ID and e-mail address remain unchanged, the user can acquire a new device with a new PIN and still be recognizable by the mobile application server as the same user. User information (e.g. contact lists, buddy lists, profiles, settings, etc) can thus be restored from the user's account at the server to the device. This is not only useful when a user switches to a new device but also in cases where a user wipes a device.

Figure 7:
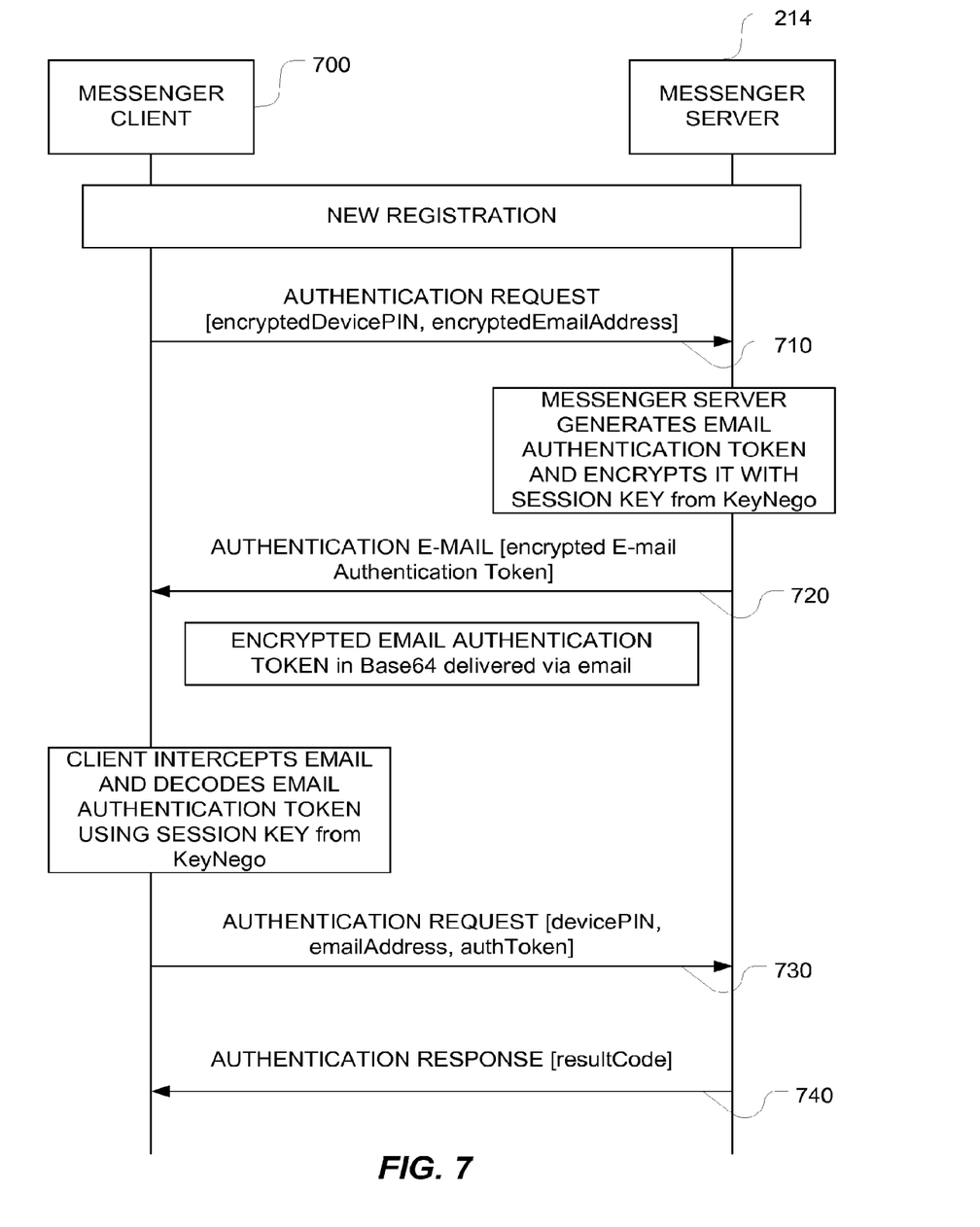
FIG. 7 depicts a message flow for an authentication protocol in accordance with one implementation of this novel technology.

FIG. 7 presents an example of a message flow for an authentication protocol in accordance with one particular implementation. In the particular implementation depicted in FIG. 7, a messenger client 700 on the wireless communications device communicates with the messenger server 214 to process a new registration. An authentication request 710 including an encrypted device PIN and encrypted e-mail address is sent from the client to the server during an instant messaging session. The messenger server generates an e-mail authentication token and encrypts it with a session key (e.g. from KeyNego). An authentication e-mail 720 including an encrypted e-mail authentication token is then sent back to the messenger client on the device via e-mail (instead of as an instant message). The messenger client intercepts the e-mail and decodes the authentication token using the session key (e.g. KeyNego). Subsequently, an authentication request 730 containing the device PIN, e-mail address and authentication token is communicated from the device back to the server. When the server receives the authentication along with the proper PIN and e-mail address, it is satisfied that the authentication token has been sent to the correct device. At that point, the server returns an authentication response 740 to the messenger client on the device. Once this procedure has been completed, the device has the credentials (registration ID and authentication token) to automatically access the user account at the server in order to back up or restore data. In other words, back-up and restore functions can be performed without any user intervention (e.g. without requiring the user to input a login ID or password). For example, if a user adds a new buddy for instant messaging, the contact information for that new buddy (e.g. the new buddy's PIN) is stored at the device. The device can automatically back up the information about the new buddy by accessing the user's account at the server and storing that information in that account. This automatic back-up is accomplished by logging into the account using the registration ID and token.

Figure 8:
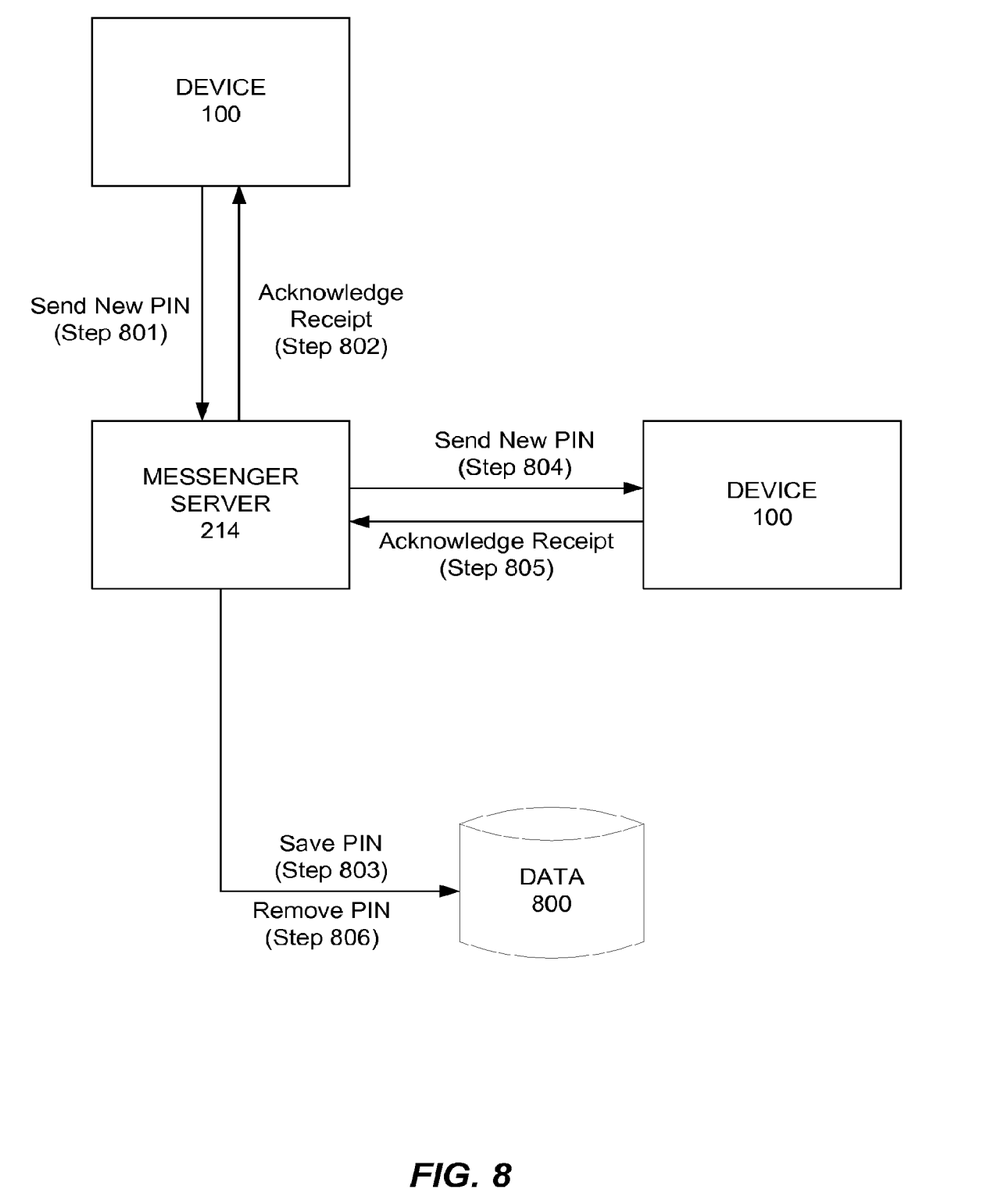
FIG. 8 depicts a method of updating PIN information when a user switches to a new device having a new PIN in accordance with one implementation of this novel technology; and It will be noted that throughout the appended drawings, like features are identified by like reference numerals.

FIG. 8 schematically depicts, by way of example, a method of updating PIN information when a user switches to a new device. In this scenario, the user switching to a new device with a new PIN wishes to notify all of his contacts/buddies that his PIN has changed. Rather than sending individual update messages, the following technique may be used to disseminate the new PIN to all contacts/buddies stored in a user account at the server. This diagram in FIG. 8 thus illustrates one specific example of how a new device with a new unique device identifier (e.g. a new device PIN) can automatically disseminate the unique device identifier (e.g. new PIN) to all contacts (buddies) when the new device connects to the network for the first time. As shown at step 801, the device 100 communicates its new unique device identifier (e.g. new PIN) to the mobile application server (e.g. the messenger server 214). The mobile application server (e.g. messenger server 214) acknowledges receipt (step 802) of the new PIN by replying to the device 100. Upon receipt by the device 100 of this confirmation or acknowledgment of receipt of the new PIN, the user of the device need not do anything further, as the mobile application server (e.g. messenger server 214) ensures that all contacts are apprised of the new PIN. At step 803, the messenger server 214 saves the new PIN in a transaction database 800 connected to or otherwise accessible by the server 214. The transaction database 800 saves the particulars of the update transaction until the transaction (updating) is complete at which point the new PIN can be removed from the transaction database 800. But prior to removing the new PIN from the transaction database, the mobile application server (e.g. messenger server 214) identifies all of the contacts (buddies) associated with the user and then communicates (step 804) the new PIN to each of these contacts or buddies (i.e. sends the new PIN information as a PIN update to each device associated with a contact or buddy). The messenger server 214 awaits an acknowledgement of receipt from each contact or buddy. Once an acknowledgement of receipt is received (step 805) for each contact who has been sent an update, the messenger server removes the new PIN from the transaction database. If not all of the contacts have replied to acknowledge receipt, then the messenger server begins to send further (intermittent) communications to the contact that has not replied at an adjustably predetermined interval until the contact replies to acknowledge receipt of the new PIN (new unique device identifier). Only then (when all contacts have confirmed receipt of the updated PIN) does the messenger server remove the new PIN from the transaction database (at step 806). The transaction database thus ensures that any contact or buddy who is temporarily out of range or whose device is temporarily shut off will eventually receive notification of the new PIN.

In other words, the instant messaging server or other mobile application server is configured to receive a new unique device identifier (e.g. a PIN) from a new device, acknowledge receipt of the new unique device identifier from the new device, save the new unique device identifier in a transaction database accessible by the server, identify the user based on one or both of the registration identifier and the e-mail address, identify contacts associated with the user, communicate the new unique device identifier to the contacts until the server has received acknowledgements of receipt from all contacts, and remove the new unique device identifier from the database.

The foregoing method steps can be implemented as coded instructions in a computer program product. In other words, the computer program product is a computer-readable medium upon which software code is recorded to perform the foregoing steps when the computer program product is loaded into memory and executed on the microprocessor of the wireless communications device.

This new technology has been described in terms of specific implementations and configurations which are intended to be exemplary only. The scope of the exclusive right sought by the Applicant is therefore intended to be limited solely by the appended claims.

The invention claimed is:

1. A method for automatic identification and authentication of a user of a mobile application executing on a wireless communications device, the method comprising:

receiving in a server from a wireless communications device both a unique device identifier identifying the device, and also an e-mail address corresponding to the wireless communications device;

associating a registration identifier with both the unique device identifier and also the e-mail address;

generating an authentication token; and returning the registration identifier and the authentication token to the device; and, subsequently receiving the registration identifier and the authentication token from the device and processing the received registration identifier as a functional equivalent of a login id and the authentication token as a functional equivalent of a password so as to authenticate the device into the server without requiring a manual input of a login id and password by an end user.

2. The method as claimed in claim 1 wherein the mobile application is an instant messaging application and wherein the server is an instant messaging server.

3. The method as claimed in claim 2 wherein receiving the unique device identifier and the e-mail address comprises receiving an authentication request including an encrypted unique device identifier and an encrypted e-mail address via an instant message session from the device to the instant messaging server.

4. The method as claimed in claim 3 wherein returning the authentication token and the registration identifier comprises transmitting an authentication e-mail including an encrypted authentication token.

5. The method as claimed in claim 4 wherein transmitting the authentication e-mail comprises:

transmitting the authentication e-mail in a predetermined format to enable the instant messaging application executing on the device to automatically intercept the authentication e-mail and to automatically decode the authentication token.

6. The method as claimed in claim 5 further comprising:

receiving from the device an authentication request including the device unique identifier, the e-mail address and the authentication token; and transmitting an authentication response to the device.

7. The method as claimed in claim 2 further comprising receiving at the instant messaging server a new unique device identifier for a new device;

communicating an acknowledgement of receipt of the new unique device identifier to the new device;

saving the new unique device identifier in a transaction database accessible by the server;

communicating the new unique device identifier to another device identified by the server as being a contact of the user based on the registration identifier associated with the user;

receiving an acknowledgement of receipt of the new unique device identifier by the contact; and removing the new unique device identifier from the transaction database.

8. A method, performed on a wireless communications device, for automatically registering a user of a mobile application executing on the wireless communications device with a server, the method comprising:

determining an e-mail address corresponding to the wireless communications device;

communicating to the server a unique device identifier and the e-mail address to enable a registration identifier stored at the server to be associated with the unique device identifier and the e-mail address;

receiving an authentication token and the registration identifier from the server; and, subsequently transmitting the registration identifier and the authentication token to the server for processing the registration identifier as a functional equivalent of a login id and the authentication token as a functional equivalent of a password so as to authenticate the device into the server without requiring a manual input of a login id and password by an end user.

9. The method as claimed in claim 8 wherein the mobile application is an instant messaging application and wherein the server is an instant messaging server.

10. The method as claimed in claim 9 wherein communicating the unique device identifier and the e-mail address comprises transmitting an authentication request including an encrypted unique device identifier and an encrypted e-mail address via an instant message session from the device to the instant messaging server.

11. The method as claimed in claim 10 wherein receiving the authentication token and the registration identifier comprises:

intercepting an authentication e-mail including an encrypted authentication token;

decoding the authentication token; and transmitting back to the server through the instant message session an authentication request including the unique device identifier, e-mail address and authentication token.

12. The method as claimed in claim 9 comprising:

communicating a new unique device identifier to the instant messaging server;

receiving an acknowledgement of receipt from the instant messaging server to notify the user of the new device that the new unique device identifier will be distributed by the instant messaging server to all contacts stored at the instant messaging server in association with a registration identifier for the user.

13. A wireless communications device comprising:

a processor operatively coupled to memory for determining an e-mail address and a unique device identifier corresponding to the wireless communications device; and a radiofrequency transceiver for communicating to a server a unique device identifier and the e-mail address to enable a registration identifier stored at the server to be associated with the unique device identifier and the e-mail address; for receiving an authentication token and the registration identifier from the server; and for subsequently transmitting the registration identifier and the authentication token to the server for processing the registration identifier as a functional equivalent of a login id and the authentication token as a functional equivalent of a password so as to authenticate the device into the server without requiring a manual input of a login id and password by an end user.

14. The device as claimed in claim 13 wherein the server is an instant messaging server and wherein the radiofrequency transceiver communicates the unique device identifier and e-mail address to the instant messaging server via an instant messaging session between the instant messaging server and an instant messaging application executing on the device and then receives the authentication token via an authentication e-mail communicated from the server to the device.

15. The device as claimed in claim 14 wherein the instant messaging application on the device is programmed to automatically intercept the authentication e-mail received by the device and to automatically decode the authentication token.

16. The device as claimed in claim 15 wherein the instant messaging application on the device is further programmed to transmit an authentication request including the unique device identifier, e-mail address and authentication token back to the server via the instant messaging session.

17. A mobile application server comprising:
a network connection for receiving from a wireless communications device a unique device identifier and an e-mail address corresponding to the wireless communications device;
a memory for storing a registration identifier;
a processor operatively coupled to the memory for associating the registration identifier with the unique device identifier and the e-mail address, for receiving from a wireless communications device both a unique device identifier identifying the device, and also an e-mail address corresponding to the wireless communications device, for associating a registration identifier with both the unique device identifier and also the e-mail address, for generating an authentication token; for returning the registration identifier and the authentication token to the device, and for subsequently receiving the registration identifier and the authentication token from the device and processing the received registration identifier as a functional equivalent of a login id and the authentication token as a functional equivalent of a password so as to authenticate the device into the server without requiring a manual input of a login id and password by an end user.

18. The mobile application server as claimed in claim 17 wherein the unique device identifier and e-mail address are received in an authentication request during an instant messaging session between an instant messaging application executing on the device and the mobile application server acting as an instant messaging server.

19. The mobile application server as claimed in claim 18 wherein the server is configured to await reception of an authentication request including the unique device identifier, e-mail address and authentication token and to reply with an authentication response confirming that the authentication of the user with the server has been successfully completed.

20. The mobile application server as claimed in claim 18 wherein the server is configured to:
receive a new unique device identifier from a new device;
acknowledge receipt of the new unique device identifier from the new device;
save the new unique device identifier in a transaction database accessible by the server;
identify the user based on one or both of the registration identifier and the e-mail address;
identify contacts associated with the user;
communicate the new unique device identifier to the contacts until the server has received acknowledgements of receipt from all contacts; and
remove the new unique device identifier from the database.

21. A method for automatic identification and authentication of a user to access an account, the method comprising:
creating an account at a server by associating a registration identifier for the account with a unique device identifier for a device and an e-mail address associated with the device;
communicating to the server the registration identifier and an authentication token that was provided to the device by the server when the account was created; and,
processing the received registration identifier as a functional equivalent of a login id and the authentication token as a functional equivalent of a password so as to authenticate the device into the account at the server without requiring a manual input of a login id and password by an end user.

22. The method as claimed in claim 21 wherein the device data is PIN-related information and wherein the unique device identifier is a PIN for the device.

23. The method as claimed in claim 21 wherein accessing the account comprises communicating only the e-mail address from which the registration identifier for the account is determined.

24. The method as claimed in claim 21 further comprising communicating only the new unique device identifier from which the registration identifier for the account is determined.

* * * * *